United States Patent [19]

Tsou et al.

[11] Patent Number: 5,385,704
[45] Date of Patent: Jan. 31, 1995

[54] PROCESS OF MAKING POLYETHYLENE TEREPHTHALATE PHOTOGRAPHIC FILM BASE

[75] Inventors: Andy H. Tsou; Jehuda Greener; Gary D. Smith, all of Rochester; Gary M. Mosehauer, Webster, all of N.Y.

[73] Assignee: Eastman Kodak Company, Rochester, N.Y.

[21] Appl. No.: 98,488

[22] Filed: Jul. 27, 1993

[51] Int. Cl.$^6$ ............................................. B29C 55/14
[52] U.S. Cl. ............................ 264/210.7; 264/235.8; 264/342 RE
[58] Field of Search ............ 264/210.7, 235.8, 342 RE

[56] References Cited

U.S. PATENT DOCUMENTS

| | | | |
|---|---|---|---|
| 4,042,569 | 8/1977 | Bell et al. | 264/235.8 X |
| 4,370,291 | 1/1983 | Kazama et al. | 264/210.7 |
| 4,497,865 | 2/1985 | Minami et al. | 264/210.7 X |
| 4,587,071 | 5/1986 | Minami et al. | 264/210.7 |
| 4,610,833 | 9/1986 | Kanesaki et al. | 264/235.8 |
| 4,617,164 | 10/1986 | Kanesaki et al. | 264/235.8 |
| 4,677,188 | 6/1987 | Utsumi et al. | 264/235.8 X |
| 5,093,064 | 3/1992 | Utsumi et al. | 264/210.7 |

OTHER PUBLICATIONS

"Structure-Properties Relationships in Biaxially Oriented Polypropylene Films", *Polymer Engineering and Science*, by A. J. De Vries, Mid-Apr., 1983, vol. 23, No. 5, pp. 241-246.

"Microstructural Aspects of Failure in Semicrystalline Polymers", by J. M. Schultz, *Polymer Engineering and Science*, Jul., 1984, vol. 24, No. 10, pp. 770-785.

*Structure and Properties of Polymer Films*, Plenum Press, N.Y., N.Y. 1973, "Quantitative Structural Characterization of the Mechanical Properties of Poly(ethylene terephthalate)" by R. J. Samuels, pp. 191-234.

Abstract of Japan 62-172,031 (Published Jul. 29, 1987).
Abstract of Japan 63-235,338 (Published Sep. 30, 1988).
Abstract of Japan 63-237,927 (Published Oct. 4, 1988).
Translation of German 3,829,239 (Published Mar. 9, 1989).

*Primary Examiner*—Leo B. Tentoni
*Attorney, Agent, or Firm*—Robert A. Gerlach

[57] ABSTRACT

The invention provide an improved polyethylene terephthalate photographic film base having excellent dimensional stability, optical clarity and mechanical strength while also possessing a crystalline configuration that enables finishing by cutting, chopping or perforating techniques at reduced fracture resistance with decreased generation of dirt.

5 Claims, No Drawings

PROCESS OF MAKING POLYETHYLENE TEREPHTHALATE PHOTOGRAPHIC FILM BASE

FIELD OF THE INVENTION

This invention relates to polyethylene terephthalate photographic film base having improved properties and to a method of preparing the same. More particularly, the invention relates to polyethylene terephthalate photographic film base having improved properties with regard to cutting, chopping and perforating.

Polyethylene terephthalate films exhibit excellent properties for use as photographic film base with regard to transparency, mechanical strength, dimensional stability, resistance to thermodeformation, curling and water. However, polyethylene terephthalate films are extremely tough and not well suited for finishing operations including slitting, chopping and perforating processes which are required in the preparation of photographic film.

DESCRIPTION OF RELATED ART

In applications, such as packaging, adhesive tapes, substrates for magnetic tapes, cards and labels and the like where optical properties of the article of manufacture are of no consequence, it has been a practice to add various types of particles to the polyethylene terephthalate resin in order to render them more easily fabricated. Japanese patent publications 63235338, 1988; 63237927, 1988; and 62172031, 1987 are illustrative of this technique.

German OLS DE 3829239 published Mar. 9, 1989 suggests a magnetic recording film on a polyethylene terephthalate support wherein the cutting index (Z) is dependent upon the turbidity, the surface orientation and the difference in refractive index in the machine direction and the transverse direction of the support. Since the use is for magnetic recording, the support is not applicable for use as a light-sensitive photographic support because of the high turbidity value thereof.

U.S. Pat. No. 4,677,188 issued Jun. 30, 1987 is directed to biaxially stretched transparent polyester film having excellent transparency and slipperiness; however, it contains no recognition of the need to provide films that are easily cut, chopped or perforated while generating low quantities of dire in the process.

SUMMARY OF THE INVENTION

The invention provides an improved polyethylene terephthalate photographic film base having excellent dimensional stability, optical clarity and mechanical strength while also possessing a crystalline configuration that enables finishing by cutting, chopping or perforating techniques at reduced fracture resistance with decreased generation of dirt. This is achieved by carefully controlling the process of manufacture to produce a biaxially oriented polyethylene terephthalate film having a planar birefringence of from 0.12 to 0.149. The polyethylene terephthalate film base is prepared by sequentially carrying out the following steps:

a. casting a molten polyethylene terephthalate resin having an inherent viscosity (I.V.) of from 0.5 to 0.8 onto a casting surface;

b. orienting by stretching in the machine direction at a stretch ratio of from 2.0 to 4.0 and a temperature of from about 70° C. to about 130° C.;

c. tentering by stretching in the transverse direction, at a temperature of from about 70° C. to about 130° C. and a stretch ratio of from about 2.0 to 4.0;

d. heatsetting with constraint as in step (c) at a temperature of from about 200° C. to about 250° C.

e. detentering at the temperature of step (d) by permitting the width to shrink from 2 to 20% to achieve a film having a planar birefringence of from 0.12 to 0.149.

DETAILED DESCRIPTION OF THE INVENTION

In the process described above, a polyethylene terephthalate resin having an inherent viscosity of 0.5 to 0.8, preferably from 0.6 to 0.7 is cast under molten conditions at a temperature of from 270° C. to 300° C. upon a cooling surface at a temperature of from 40° C. to 70° C. in the form of a sheet. The inherent viscosity (IV) is measured at 25° C. in a solvent mixture of phenol/chlorobenzene (60/40 by weight) at a concentration of 0.25 g/dl with a Ubbelhode glass viscometer.

The continuous sheet is removed from the casting surface and passed into a drafting zone where it is first preheated to a temperature of 70° C. to 230° C. and then stretched in the machine direction an a stretch ratio of 2.0 to 4.0, preferably at a stretch ratio of 3.0 to 3.5, at a temperature of from 70° C. to 130° C., preferably from about 90° C. to 105° C. The drafting zone includes two sets of nipped rollers, the first being the entrance to the drafting zone and the second the exit from the drafting zone. To achieve the stretch ratios necessary for the practice of this invention, the exit nip rollers are rotated at a speed greater than the entrance nip rollers. The film is cooled in the last stage of the drafting zone to 25° C. to 40° C.

The film moves from the drafting zone into a tentering zone where it is preheated to 70° C. to 230° C. and stretched in the transverse direction at a stretch ratio of 2.0 to 4.0, preferably from 2.8 to 3.3, at a temperature of from about 70° C. to about 130° C., preferably at a temperature of from about 95° C. to about 115° C. The tentering zone includes a means for engaging the film at its edges and stretching such that the final width is from 2.0 to 4.0 times that of the original width. The film is next heatset by maintaining it at a temperature of from about 200° C. to 250° C., preferably from about 210° C. to about 240° C. while being constrained as in the tentering zone for a time sufficient to affect heatsetting. Times longer than necessary to bring about this result are not detrimental to the film; however, longer times are undesired as the lengthening of the zone requires higher capital expenditure without achieving additional advantage. The heatsetting step is accomplished within a time period of 0.1 to 15 and preferably 0.1 to 10 seconds. Finally, the film is detentered by permitting it to shrink from about 10% to about 20% of its width, preferably from about 12% to about 18% to achieve a planar birefringence of from 0.12 to 0.149, preferably from 0.13 to 0.14. In the detentering step, the means for tentering are relaxed so that once the film shrinks to the desired percent, the means for holding the edges of the film do not permit further shrinkage thereof.

It has been determined that a polyethylene terephthalate film having the planar birefringence set forth exhibits extremely good properties with regard to reduced dirt and debris when being cut, chopped or perforated and that these properties result primarily from the three processing steps of utilizing a low stretch ratio in the drafting and tentering steps, a high heatsetting temperature, both of which are in conjunction with the step of permitting shrinkage between limits of 10% to 20%.

By planar birefringence is meant, the difference between the average refractive index in the film plane and the refractive index in the thickness direction. That is, the refractive index in the machine direction and the transverse direction are totaled, divided by two and then the refractive index in the thickness direction is subtracted from this value to yield the value of the planar birefringence. Refractive indices are measured using an Abbe-3L refractometer using the procedure set forth in *Encyclopedia of Polymer Science & Engineering*, Wiley, NY, 1988, pg. 261. It has been found by conducting the process of preparing the PET film in accordance with that described above that a planar birefringence within the above-expressed values results. Further, in accordance with this process, a photographic film support having a modulus greater than 650 ksi and a yield stress greater than 12 ksi results.

Fracture resistance is measured on a test device for monitoring the cutting forces and the knife travel for cuts taking place in times as short as 0.01 millisecond. The device includes a lower stationary knife upon which is placed the film support sample to be tested. The sample is placed with its forward edge extending slightly beyond the knife edge. A strain gauge is mounted on the lower knife to monitor the force during cutting. The strain gauge is calibrated by applying a weight acting through a lever arm to the lower knife. An upper knife, positioned relative with respect to the lower knife in order to form a shearing zone, is driven pneumatically at speeds from 5 to 80 inches per second. The upper knife is guillotine-like in appearance and its cutting edge has a rake angle of 0°. A position transducer is attached to the upper knife housing which measures the amount of knife travel. A photodiode is mounted on the housing which provides a triggering pulse to activate an accompanying signal processor. Clearance between the upper and lower knives is held at 0.0003". Information from the source and distance transducers is recorded on a Nicolet signal processor having two chathels. The first chathel records the force as a function of time and the other chathel records knife travel as a function of time. The distance that the upper knife travels into the film to initiate a crack is readily measured by this device. The fracture resismance is defined as the distance the knife travels from crack initiation to final fracture divided by the film thickness, expressed as percent (%). Fracture resistance as used throughout this specification, is measured utilizing the testing device described above at a cutting speed of 15 inches per second (38 cm/sec).

PET films having the properties set forth above and prepared by the process described above generate significantly reduced amount of dirt and debris upon being slit, cut, chopped and/or perforated to produce photographic film when compared with PET film normally employed for this purpose. In fact, the films prepared in accordance with this invention compare favorably with cellulose triacetate which has been the film base of choice for long periods of time in the photographic industry because of its physical characteristics.

The invention will be further illustrated in the following examples:

Example 1

Film grade polyethylene terephthalate resign powder having an I.V. of 0.63 obtained from Eastman Chemical Co. is fed into a single screw extruder wherein it is heated to a temperature of about 280° C. and cast at this temperature through a die unto a quench wheel maintained at a temperature of about 50° C. The film is separated from the quench wheel and passed over suitably positioned rollers to a drafting section wherein the exit roller is driven at a speed greater than the speed of the entrance roller to achieve a stretch ratio of 3.3. In the drafting section the film is preheated to a temperature of 100° C., and stretched at a temperature of the film of 95° C. Prior to exiting the drafting section, the film is cooled by cooling air at a temperature of 35° C. The film is then passed into a tentering zone where it is initially heated to a temperature of 85° C. and stretched at a temperature of 105° C. at a stretch ratio of 3.0 in the transverse direction. Air is delivered to the surface of the film during this operation at 90° C. Immediately following the tentering step, heatsetting is applied wherein the film is maintained under constant constraint at a temperature of 232° C. Subsequently, the film is detentered by 14% while still being held by the tentering device but without any force being applied thereto. This film has good thickness uniformity, excellent optical clarity and dimensional stability. The density is 1.3959, planar birefringence is 0.1465 and fracture resistance is 19.2%. In comparison, a standard PET film heatset at 200° C. without detentering has a density of 1.3905, a planar birefringence of 0.1592 and a fracture resistance of 27%.

Example 2

A polyethylene terephthalate film with a fracture resistance of 16.5% is made following the procedure of Example 1 but heatsetting and detentering are conducted at 224° C. and 15% shrinkage respectively. The density of this film is 1.3966 and the planar birefringence is 0.1414. To this film is applied a U-coat to facilitate adhesion of the emulsion layers. The U-coat is a terpolymer of acrylonitrile, vinylidene chloride and acrylic acid made in accordance with U.S. Pat. No. 3,919,156. This film is coated on the backside with a carbon black dispersion in a cellulose acetate naphthalate binder and on the front side with a multilayer color photographic emulsion described as follows, layer 1, the blue sensitive layer being closest to the film support:

|  |  | mg/ft$^2$ |
| --- | --- | --- |
| Layer 1: | Blue-sensitive Layer Emulsion (1) |  |
|  | Silver halide | 85 |
|  | Gelatin | 316 |
|  | Coupler -1 | 175 |
|  | Dispersion Oil -2 | 44 |
|  | Sensitizing Dye -1 | 0.131 |
| Layer 2: | Interlayer |  |
|  | Gelatin | 57 |
| Layer 3: | Red-Sensitive Layer Emulsion (2) |  |
|  | Silver halide | 37 |
|  | Gelatin | 262 |
|  | Coupler -2 | 121 |
|  | Dispersion Oil -1 | 10 |
|  | Dispersion Oil -3 | 10 |
|  | Sensitizing Dye -2 | 0.063 |

-continued

| | | mg/ft² |
|---|---|---|
| Layer 4: | Interlayer | |
| | Gelatin | 57 |
| Layer 5: | Green-Sensitive Layer Emulsion (3) | |
| | Silver halide | 56 |
| | Gelatin | 203 |
| | Coupler -3 | 65 |
| | Dispersion Oil -1 | 33 |
| | Sensitizing Dye -3 | 0.104 |
| Layer 6 | Protective Layer | |
| | Gelatin | 91 |
| | Hardener -1 | 1.6 |

The silver halide emulsions are prepared from an aqueous solution of gelatin. Sodium thiosulfate and chloroauric acid are added to the emulsions to perform chemical sensitization. The properties of the resultant emulsions are summarized in Table 1.

TABLE 1

| Emulsion | Silver Bromide (mol %) | Average Grain Size (μm) | Grain Shape | Weight Percent |
|---|---|---|---|---|
| (1) | 1.5 | 0.6 | cubic | 100 |
| (2) | 27 | 0.15 | cubic | 98 |
| | 27 | 0.25 | cubic | 2 |
| (3) | 26 | 0.15 | cubic | 94 |
| | 26 | 0.25 | cubic | 6 |

TABLE 2

| | |
|---|---|
| Dispersion Oil -1: | Tricresyl phosphate |
| Dispersion Oil -2: | Dibutyl phthalate |
| Dispersion Oil -3: | Di(tertiary amyl) phenol |
| Hardener -1: | Bisvinylsulfone methyl ether |

Sensitizing dye -1:

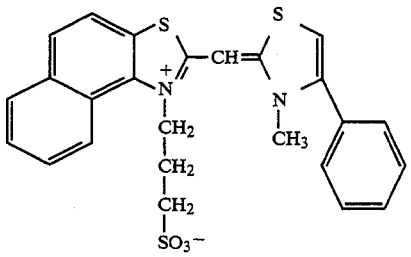

Sensitizing dye -2:

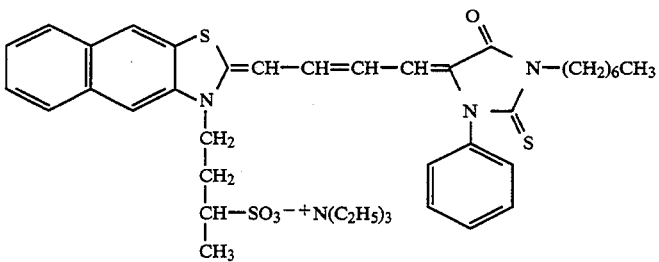

Sensitizing dye -3:

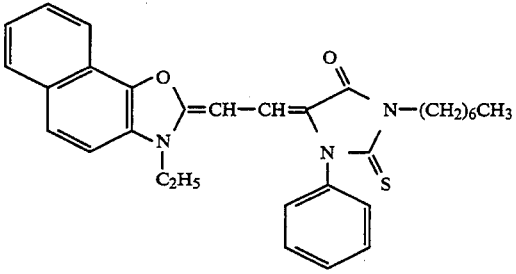

TABLE 2-continued

Coupler -1:

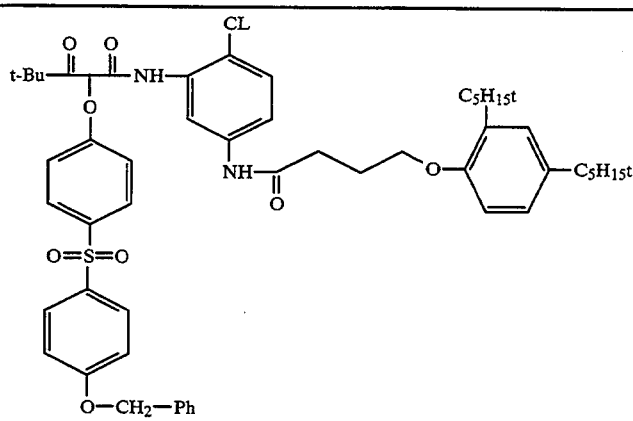

Coupler -2:

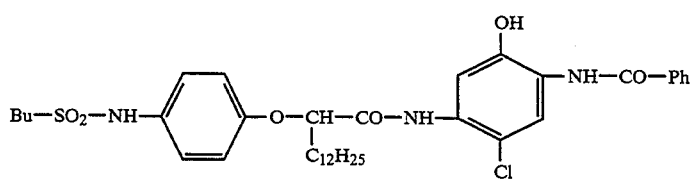

Coupler -3:

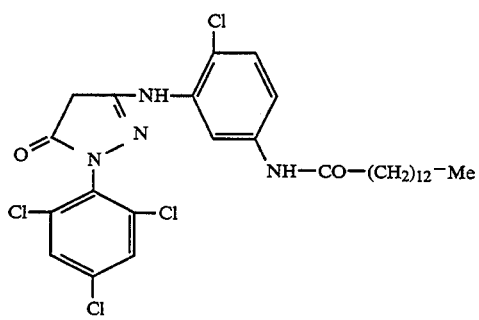

Example 3 (Comparison)

A standard polyethylene terephthalate support having a fracture resistance of 32% is coated identically as that in accordance with the procedure of Example 2.

Example 4 (Comparison)

A standard production cellulose triacetate film base is coated identically in accordance with the procedure of Example 2 except the cellulose triacetate film base contains no U-coat.

The films of Examples 2, 3, and 4 are slit using slitters and perforated with a series of production reciprocal perforators and a high-speed rotary T perforator. In all examples, conditions are identical. The slitting is conducted with one set of dull knives of 0.5 mil sharpness and one set of sharp knives of 0 mil sharpness running at speeds and rake angles corresponding to upper and lower limits of a normal production process of 75 and 500 fpm and 0 and 12 degree rake angles, respectively. The ten reciprocal perforators employed for the perforating of these films cover the whole range of the production perforators in terms of age, wear, punch geometry, and clearance. An experimental circular punch with various punch grinds to simulate the production punch wear of the T perforator is used for the evaluation of these films during T perforating.

The amount of dirt generated during slitting and perforating is determined using the tacky tape test. In this test, dirt is transformed from films to a 3M transparent pharmaceutical grade adhesive tape. The adhesive tape is wrapped, adhesive-side out, around a roller and 80 feet of the film is transported over the roller. The roller is translated back and forth, or wobbled, so that the dirt particles cannot accumulate on top of each other. The tape is then removed and mounted on a frame for optical image analysis to provide a quantitative measure of dirt coverage. Widthwise scans are made at 10 randomly selected locations and percentage of the tacky tape covered with dirt is recorded. The total accumulated dirt on both the emulsion and the support side surfaces of these films are examined and compared.

The average dirt concentrations (average over all locations of dirt collected from the film) based on dirt coverage in percentage on the tacky tape slide for all the films discussed above are listed below with their standard errors tabulated in the bracket.

|  | Slitting Dirt (%) | Reciprocal Perforating Dirt (%) | T-perforating Dirt (%) | Average Dirt (%) |
| --- | --- | --- | --- | --- |
| Example 2 | 5.26 (4.49) | 2.24 (1.68) | 7.20 (0.7) | 4.90 (1.74) |
| Example 3 | 7.77 (5.68) | 2.91 (1.25) | 27.0 (1.0) | 12.56 (1.92) |
| Example 4 | 11.53 (8.70) | 2.54 (1.83) | 10.9 (1.2) | 8.32 (2.67) |

It can be readily seen that by employing The polyethylene terephthalate film base in accordance with this invention, lower dirt generation, even lower than that obtained utilizing conventional cellulose triacetate film base results.

What is claimed is:

1. A process for making a polyethylene terephthalate polyester photographic film base having a planar birefringence of from 0.12 to 0.149 which comprises:

casting a molten polyethylene terephthalate resin onto a casting surface to form a sheet, orienting the sheet by stretching in the machine direction, at a stretch ratio of from 2 to 3.5 and tentering in the transverse direction at a stretch ratio of from 2 to 3.3, the temperature of the sheet during orienting in the machine direction being from 90° C. to 105° C. and in the transverse direction being from 95° C. to 115° C., heatsetting the tentered film with constraint at a temperature of 200° C. to 250° C. and detentering the heatset film by permitting the width to shrink from 2 to 20 percent.

2. The process of claim 1 wherein in the detentering step, the film is permitted to shrink in width from 10 to 20 percent.

3. The process of claim 2 wherein in the detentering step, the film is permitted to shrink in width from 12 to 18 percent.

4. The process of claim 1 wherein the molten polyester is cast at a temperature of from 270° C. to 300° C., has an inherent viscosity of from 0.5 to 0.8, the casting surface has a temperature of from 40° C. to 70° C.

5. The process of claim 1 wherein the stretch ratio in the machine direction is 3 to 3.5 and the stretch ratio in the transverse direction is 2.8 to 3.3.

* * * * *